Patented Oct. 11, 1932

1,881,565

UNITED STATES PATENT OFFICE

CLYDE O. HENKE AND GASTAO ETZEL, OF SOUTH MILWAUKEE, WISCONSIN, ASSIGNORS, BY MESNE ASSIGNMENTS, TO NEWPORT INDUSTRIES, INC., A CORPORATION OF DELAWARE

PROCESS OF PREPARING RETENE

No Drawing.   Application filed July 28, 1930.   Serial No. 471,431.

This invention relates to a process of preparing retene.

Retene has heretofore been prepared from abietic acid or abietic acid containing material, such as rosin, by reacting thereon with sulfur at an elevated temperature and vacuum distilling. In general, the prior process comprises heating rosin with about one-half its weight of sulfur to about 250° C. During the heating period, sulfide and mercaptan bodies are evolved and carbon dioxide is split from the carboxy groups of abietic acid to give retene. The reaction is largely one of dehydrogenation.

At the end of the reaction period, indicated by the cessation in the liberation of gases, the mass is vacuum distilled, whereupon an oily distillate is obtained which upon crystallization from alcohol yields retene. The process is very similar whether rosin, abietic acid, abietene or esters of abietic acid be used.

In the process as above described, however, the crystallization of the retene is very tedious and laborious, due apparently to the presence of hydrocarbons that are distilled out of the reaction mass along with the retene. Repeated crystallization, or separation of two layers and crystallization has been resorted to in order to produce pure retene.

Thus in a very extensive study on this process by Cheung (Bull. L' Institute du Pin for 1929, pages 108-110, 159-164, 190-193 and 215-220) twelve extractions of the vacuum distillate were made to isolate the retene and much of it was still quite impure and had to be recrystallized.

It is therefore an important object of this invention to provide an improved process for preparing retene in a relatively high state of purity in a simpler and quicker manner and without the necessity of repeated crystallizations.

Other and further important objects of this invention will become apparent from the following description and appended claims.

We have discovered that a relatively good yield of retene of high purity can be secured by a single crystallization if the retene be steam distilled from the sulfur reaction mass under reduced pressure. The oil layer of the distillate is separated from the steam condensate, dissolved in 3 volumes of 95% alcohol, allowed to cool to 25° C. and the resulting crystals centrifuged, washed and dried. The retene so prepared is of high purity, in the form of flakes and has a melting point of 96 to 99° C.

On cooling the alcohol solution of the oily layer of the vacuum steamed distillate, there is no separation into two layers, as in the process of the prior art above described. We believe that in the vacuum steaming a smaller quantity of hydrocarbons is produced in the distillate and that because of this we do not get a lower oil layer.

Our process is applicable to rosin, both gum and wood, to abietic acid and its esters, and to abietene, abietine and abietane. We prefer to carry out the steaming under a vacuum of 25 to 28" and at a temperature of 250 to 275° C. Other temperatures and higher or lower vacua may be used. Cuts may be made during the vacuum steaming if desired.

To obtain further quantities of retene, the alcohol mother liquor from the retene crystallization may be evaporated, the residue treated with sulfur and vacuum steamed in exactly the same way as when starting with rosin.

Without limiting our invention to any specific procedure, the following example, in which parts by weight are expressed, will serve to illustrate a preferred embodiment.

Example 200 parts of wood rosin are placed in an iron kettle and heated with agitation to 200° C. 100 parts of sulfur are then slowly added, the temperature of the mass being maintained at about 200° C. during the addition of the sulfur. The temperature is then raised to about 250° C. and after about ½ hour at this temperature to allow the escape of the final decomposition gases, a good vacuum, 25 to 28" of mercury, is placed upon the kettle and water vapor (steam) is passed through the molten mass. The vapors coming from the container are condensed in the usual manner.

The condensate contains, besides water, a semi-oily layer, which is practically solid at the temperature of the cooling water during the early part of the distillation, finally becoming more and more liquid as the distillation progresses. When about 48 parts of oil have been distilled over (semi-solid at low temperatures), constituting the first fraction, the remaining oil, constituting the second fraction and amounting to about 30 parts, from the distillation is run into a separate receiver.

The oily layer (semi-solid at 20° C.) in fraction No. 1 is dissolved in 115 parts of 95% alcohol by warming and then cooled to 20 to 25° C. The retene crystallizes out in a practically pure state and can be recovered by filtration. The product is improved by washing well with alcohol. After the alcohol has been removed from the product it has a melting point of 96 to 99° C.

The material retained in solution in the alcohol filtrate from the above filtration may be recovered by distilling off the alcohol. The residue, either alone or combined with fraction No. 2, may be re-treated with sulfur to yield further quantities of retene.

Instead of steam, other readily condensible vapors may be used, as for instance, alcohol or naphtha. For practical reasons, however, steam is to be preferred. The use of a second volatile, condensible medium in addition to the vacuum, effects a cleaner separation between the retene and the oily decomposition products formed in the reaction. As a result, substantially pure retene is obtained in a single recrystallization from alcohol, as above illustrated.

The temperature at which the distillation is carried out may vary within wide limits. However, the use of temperatures higher than 300° C. or lower than 225° is not preferred. At higher temperatures than 300° C., decomposition products are formed and this makes the separation of pure retene more difficult. At temperatures below 225° C., the distillation proceeds so slowly, and requires such a high steam ratio, as to make the process too expensive for practical purposes. For best results, the range of 250 to 275° C. should be adhered to.

A similar condition holds true for the degree of vacuum. In other words, our process will operate at a lower degree of vacuum than 25 inches, but the time and quantity of steam required rise to prohibitive values.

We are aware that numerous details of the process may be varied through a wide range without departing from the principles of this invention, and we, therefore, do not purpose limiting the patent granted hereon otherwise than necessitated by the prior art.

We claim as our invention:

1. In a process of preparing retene from one of a group consisting of gum rosin, wood rosin, abietic acid, abietic acid esters, abietine, abietene and abietane by treatment with sulfur, the step of distilling the sulfur containing reaction mass under reduced pressure and at an elevated temperature in the presence of a stream of a readily condensible vapor.

2. In a process of preparing retene from one of a group consisting of gum rosin, wood rosin, abietic acid, abietic acid esters, abietine, abietene and abietane by treatment with sulfur, the step of distilling the sulfur containing reaction mass under reduced pressure and at an elevated temperature with steam.

3. In a process of preparing retene from one of a group consisting of gum rosin, wood rosin, abietic acid, abietic acid esters, abietine, abietene and abietane by treatment with sulfur, the step of distilling the sulfur containing reaction mass under reduced pressure and at a temperature of 250 to 275° C. with steam.

4. In a process of preparing retene from one of a group consisting of gum rosin, wood rosin, abietic acid, abietic acid esters, abietine, abietene and abietane by treatment with sulfur, the step of distilling the sulfur containing reaction mass under a vacuum of 25 to 28 inches and at a temperature of 250 to 275° C. with steam.

5. In the process of preparing retene from rosin by treatment with sulfur, the step of steam distilling the sulfur-rosin reaction mass at a temperature of about 250° C. under a vacuum of about 25 to 28 inches of mercury.

6. The process of preparing retene, which comprises adding sulfur to a molten mass of rosin, heating the sulfur-rosin mass to about 250° C., steam distilling the reaction mass at about 250 to 275° C. under high vacuum, collecting the portion of the distillate that is an oily layer semi-solid at 20° C., dissolving said oily layer in warm alcohol and cooling the alcohol solution to effect crystallization of retene.

7. The process of preparing retene, which comprises heating a mixture of rosin and sulfur at about 250° C. until a substantial cessation of the liberation of decomposition gases occurs, passing steam through the reaction mass while maintained at a temperature of 250 to 275° C. and under high vacuum and recovering retene from the distillate.

8. The process of preparing retene, which comprises heating a mixture of rosin and sulfur at about 250° C. until a substantial cessation of the liberation of decomposition gases occurs, passing steam through the reaction mass while maintained at a temperature of 250 to 275° C. and under high vacuum, collecting the portion of the distillate that is an oily layer semi-solid at 20° C., dissolving said oily layer in warm alcohol and cooling to effect crystallization of retene.

9. The process of preparing retene, which comprises heating a mixture of rosin and sulfur at about 250° C. until the evolution of decomposition gases practically ceases, placing the rosin-sulfur reaction mass under a vacuum of 25 to 28 inches of mercury while maintaining the temperature of the mass at 250 to 275° C., passing steam through said reaction mass to effect distillation of oily material and crystallizing retene from said oily distillate.

In testimony whereof, we have hereunto subscribed our names at Carrollville, Milwaukee County, Wisconsin.

CLYDE O. HENKE.
GASTAO ETZEL.